United States Patent [19]
Blatt et al.

[11] Patent Number: 5,174,709
[45] Date of Patent: Dec. 29, 1992

[54] WORKPIECE TRANSFER DEVICE

[75] Inventors: John A. Blatt, Grosse Pointe Shores; David J. Crorey, Shelby Township, Macomb County, both of Mich.

[73] Assignee: Leland D. Blatt, Grosse Pointe Farms, Mich. ; a part interest

[21] Appl. No.: 665,029

[22] Filed: Mar. 6, 1991

[51] Int. Cl.5 .............................. B65G 47/90
[52] U.S. Cl. .................. 414/567; 414/591; 414/744.2; 414/751; 198/468.2
[58] Field of Search ........ 414/567, 591, 744.1, 414/744.2, 749, 751, 752, 543, 223; 198/375, 468.2, 468.4, 468.5, 468.6; 901/6, 17, 21

[56] References Cited

U.S. PATENT DOCUMENTS

| | | | |
|---|---|---|---|
| 904,457 | 11/1908 | Schuman | 414/543 |
| 2,971,389 | 2/1961 | Blatt | 74/110 |
| 3,665,771 | 5/1972 | Blatt | 74/29 |
| 4,037,730 | 7/1977 | Fetzer et al. | 414/591 |
| 4,280,786 | 7/1981 | Dyche | 414/749 |
| 4,466,531 | 8/1984 | Baughor et al. | 198/468.4 |
| 4,509,638 | 4/1985 | Kato et al. | 198/468.6 X |
| 4,553,444 | 11/1985 | Blatt | 74/110 |
| 4,842,476 | 6/1989 | Shiotani | 901/21 X |
| 4,921,387 | 5/1990 | Bennington | 414/751 X |
| 4,988,261 | 1/1991 | Blatt | 414/749 |
| 5,000,654 | 3/1991 | Shiotani | 414/751 |
| 5,046,916 | 9/1991 | Sörensen | 414/751 |

FOREIGN PATENT DOCUMENTS

| | | | |
|---|---|---|---|
| 0224931 | 6/1987 | European Pat. Off. | 414/223 |
| 3717957 | 12/1988 | Fed. Rep. of Germany | 414/751 |
| 0225833 | 12/1984 | Japan | 414/744.1 |

Primary Examiner—Michael S. Huppert
Assistant Examiner—James Keenan
Attorney, Agent, or Firm—Basile and Hanlon

[57] ABSTRACT

A workpiece transfer device includes a mounting frame assembly having an upper fixed frame and an inner subframe slidably mounted to the fixed frame. The inner subframe supports a gear rack on its upper surface and a separate conveying system within its frame. A drive unit is mounted on top of the fixed frame and includes idler rollers and a drive gear. The drive gear engages the gear rack thereby moving the whole inner subframe assembly, including the conveyor system in a horizontal path between two presses. As the inner subframe moves along a horizontal plane, a locking plate assembly prevents the conveyor belt from traveling with the inner subframe. The end gears in the conveyor rotate along the stationary belt forcing a workpiece carrier to move from one end of the conveyor system to the opposite end in the same direction as the inner subframe. Therefore, as the inner subframe moves in a horizontal path, the carrier is simultaneously moved along the same path.

19 Claims, 4 Drawing Sheets

WORKPIECE TRANSFER DEVICE

BACKGROUND OF THE INVENTION

I. Field of the Invention

The present invention is directed to a workpiece transfer device of the type employed with a transfer assembly to transfer workpieces from one press to another on an automated press line.

II. Description of the Prior Art

A typical cell in an automated press plant is generally comprised of a transfer assembly located between two presses for transferring workpieces from one press to another. Typically, a transfer assembly is comprised of two movable carriages. Each carriage is attached to the outside of a corresponding press. A flexible transfer unit, such as a table programmed to travel horizontally between the two presses, is positioned between the two carriage members and reachable by each carriage member's workpiece transfer device.

With this transfer assembly, a carriage member with its workpiece transfer device removes the workpiece from the press and places it on the flexible transfer unit. The transfer unit then moves horizontally toward the second carriage member to be removed by the second carriage's workpiece transfer device and transferred into the second press.

A disadvantage of this previous system is that it requires a multiple unit transfer assembly. Specifically, each carriage member is limited in the scope in which it can travel in a horizontal plane. Further, the programmer must realign the transfer unit to correspond with the line of conveyance between the two presses.

In other arrangements, a transfer assembly includes multiple workpiece transfer units which move along a track on a frame bridging the intermediate space between two presses.

Each transfer device is limited in the horizontal distance for which it may travel. Therefore, intermediate support frames are provided along the transfer route for placement of the workpiece within reach of the following transfer device. In this way, the workpiece to be transferred from one press to another is repeatedly picked up and conveyed by several transfer devices en route to another press as disclosed in U.S. Pat. No. 4,279,561.

Similar problems of requiring multi-transfer devices and correspondingly multi-positioning stages are experienced with this transfer unit. The bulky system also requires the operator to continually align the positioning stages so that the workpiece may be properly conveyed.

SUMMARY OF THE INVENTION

The present invention is directed to a workpiece transfer device having only a single carriage member and a transferring unit rotatably attached to form the transfer assembly. The workpiece transfer device extends along a horizontal plane between the two presses thereby eliminating the need for a separate transfer unit. Furthermore, the workpiece transfer device may be rotated about a transverse axis simultaneously during the horizontal transfer process to continually realign the workpiece with the press conveying line.

A workpiece transfer device embodying the present invention includes a mounting frame assembly for mounting the device to a transfer assembly unit. The mounting frame has an upper fixed frame and an inner subframe which is slidably mounted to the upper fixed frame.

The inner subframe supports a gear rack on its upper surface and a separate conveying system within its frame. The conveying system extends in a horizontal plane between the two presses for transporting of the workpiece from one press to another. The conveying system comprises two end gears defining the outer limits of the horizontal plane and a conveyor belt extending around and meshing with the gears. The upper section of the belt lies parallel with and adjacent to the gear rack. The lower side of the belt has a carrier fixedly attached to it for transporting the workpiece in a horizontal plane when the conveyor is driven. A locking plate assembly fixedly attaches the upper section of the conveyor belt to the fixed frame of the mounting frame assembly.

A drive unit is mounted on top of the fixed frame and includes a reversible electric motor. The motor is coupled to idler rollers mounted adjacent with the fixed frame and above the conveyor belt. Idler rollers drive a conveyor drive gear mounted adjacent to the idler rollers. The conveyor drive gear engages the gear rack thereby moving the whole inner subframe assembly, including the conveyor system, in a horizontal path between the two presses.

As the inner subframe moves along the horizontal plane, the locking plate assembly prevents the conveyor belt from traveling with the inner subframe. The end gears rotate along the stationary conveyor belt path forcing the carrier to move from one end of the conveyor system to the opposite end in the same direction as the inner subframe. Therefore, as the inner subframe moves in a horizontal path, the carrier is simultaneously moved along that same path.

A rotatable mounting assembly is also provided on top of the fixed frame. The mounting assembly includes a base plate fixedly attached to the fixed frame and a guide plate attached on top of the base plate. A mounting assembly is located on either side of the drive unit. Each mounting assembly is formed with a circumferential groove. The grooves define the outer circumference of a circle, the center of which is the vertical central axis of the mounting frame assembly.

The mounting frame assembly may, therefore, be rotated about its vertical central axis, if necessary, to properly align the workpiece transfer device between each press. This adjustment may be done manually by an operator or automatically through the use of an electric device, such as an electric eye, or any other automated means well known in the art.

By providing a multi-rotational conveyor system, the transfer device of the present invention provides a single unit for transferring a workpiece from one press to another, eliminating multi-carriage units in corresponding positioning stages. Further, the ability of the transfer device to automatically align itself with the conveyor line of the presses, eliminates operator alignment of the positioning stages.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiment of the present invention when read in conjunction with the accompanying drawing, in which like reference characters refer to like parts throughout the views, and in which.

DETAILED DESCRIPTION OF THE PREFERRED EMBODIMENT

Figure 1:
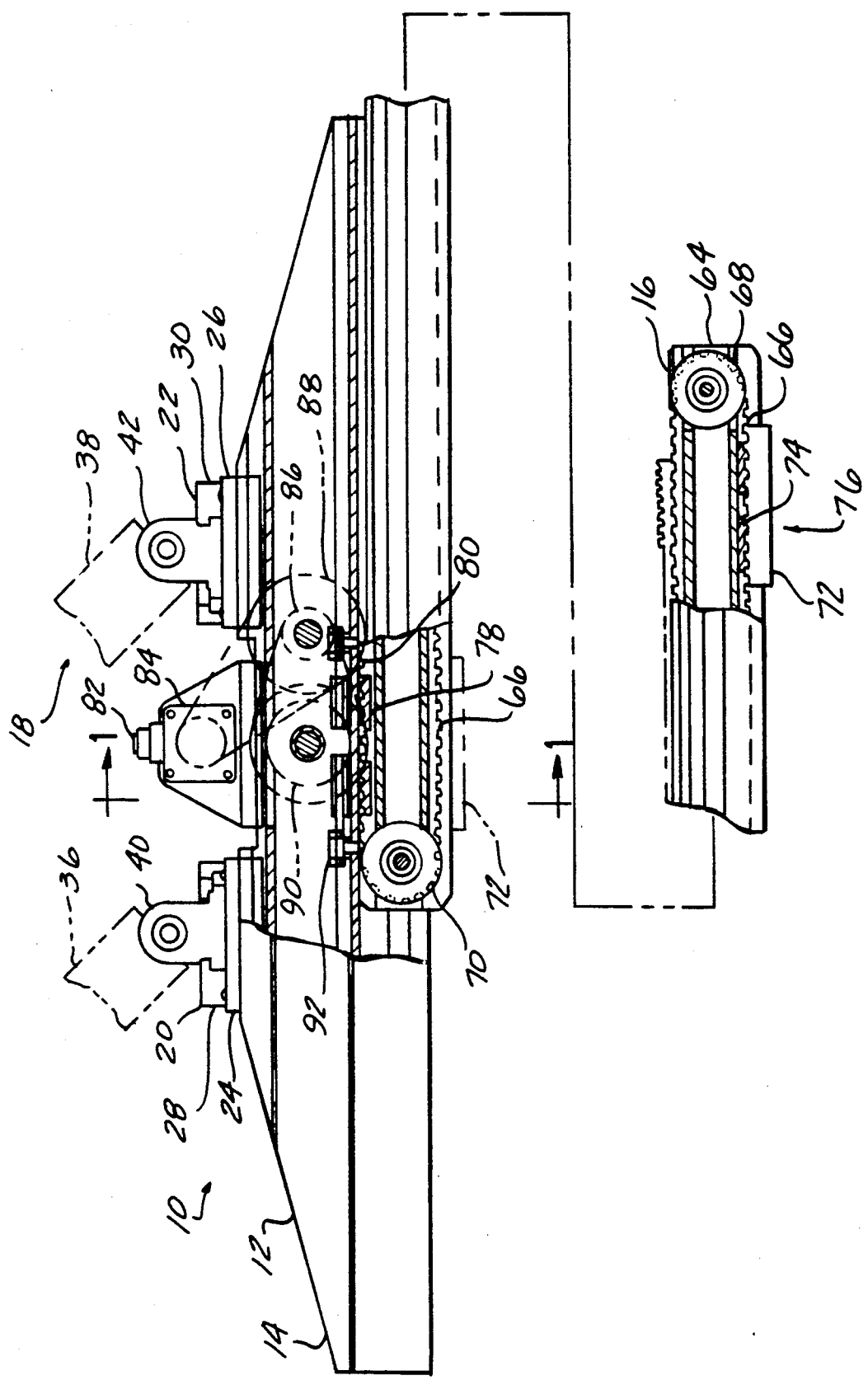
FIG. 1 is a partially cut-away side elevational view of a workpiece transfer device in accordance with the present invention.
Figure 2:
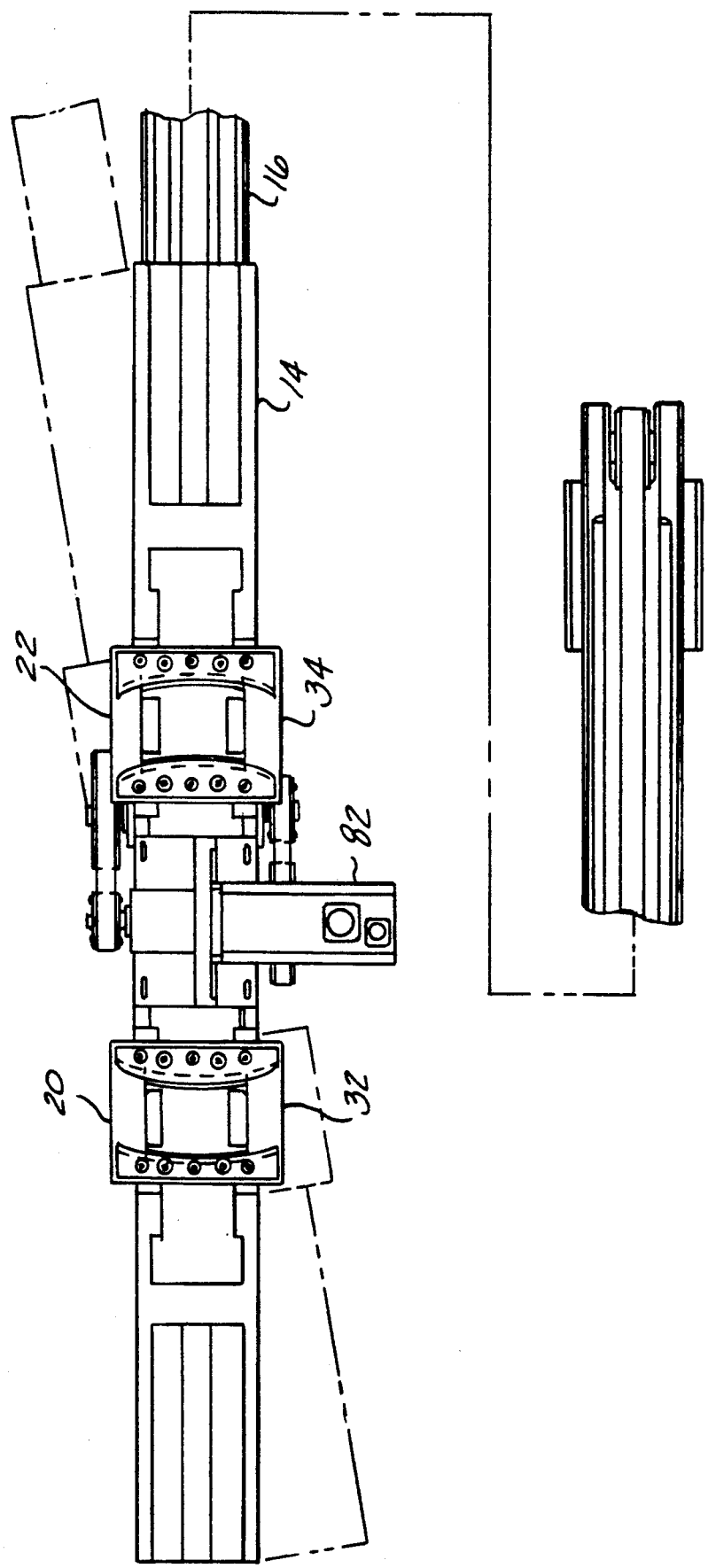
FIG. 2 is a top view according to FIG. 1.
Figure 3:
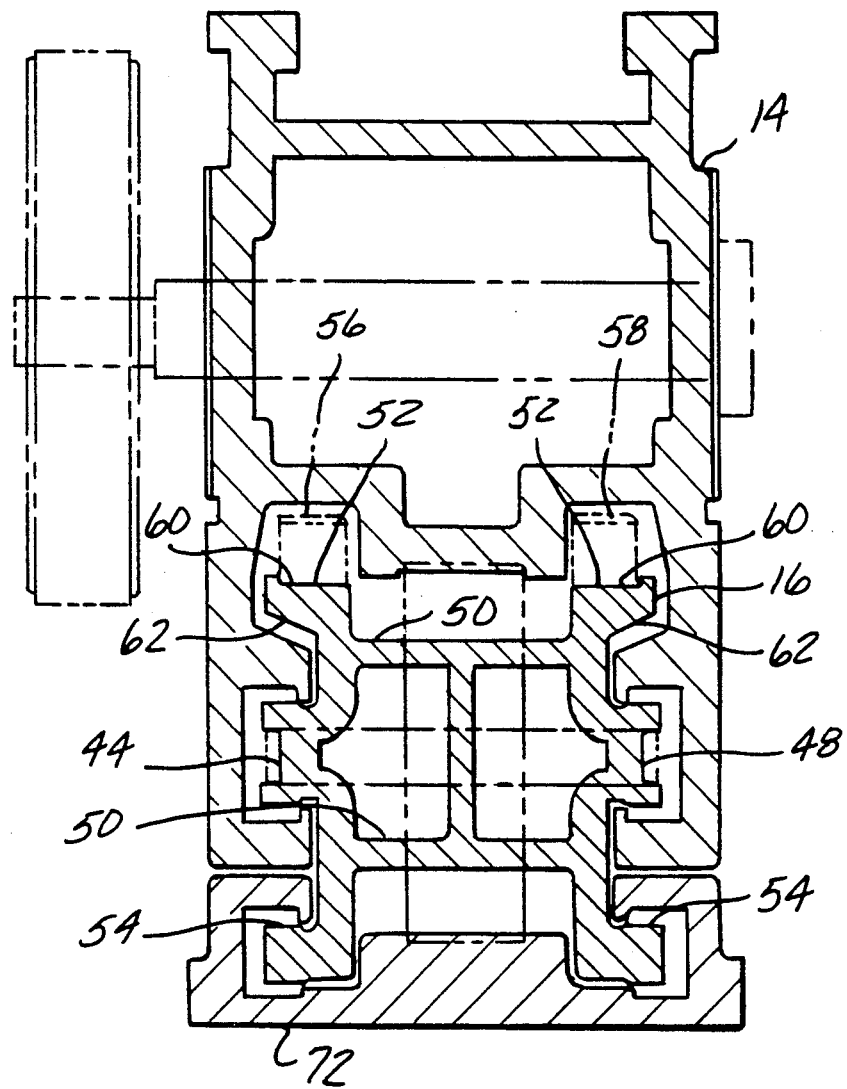
FIG. 3 is a cross-sectional view taken along line 1—1 of FIG. 1.
Figure 4:
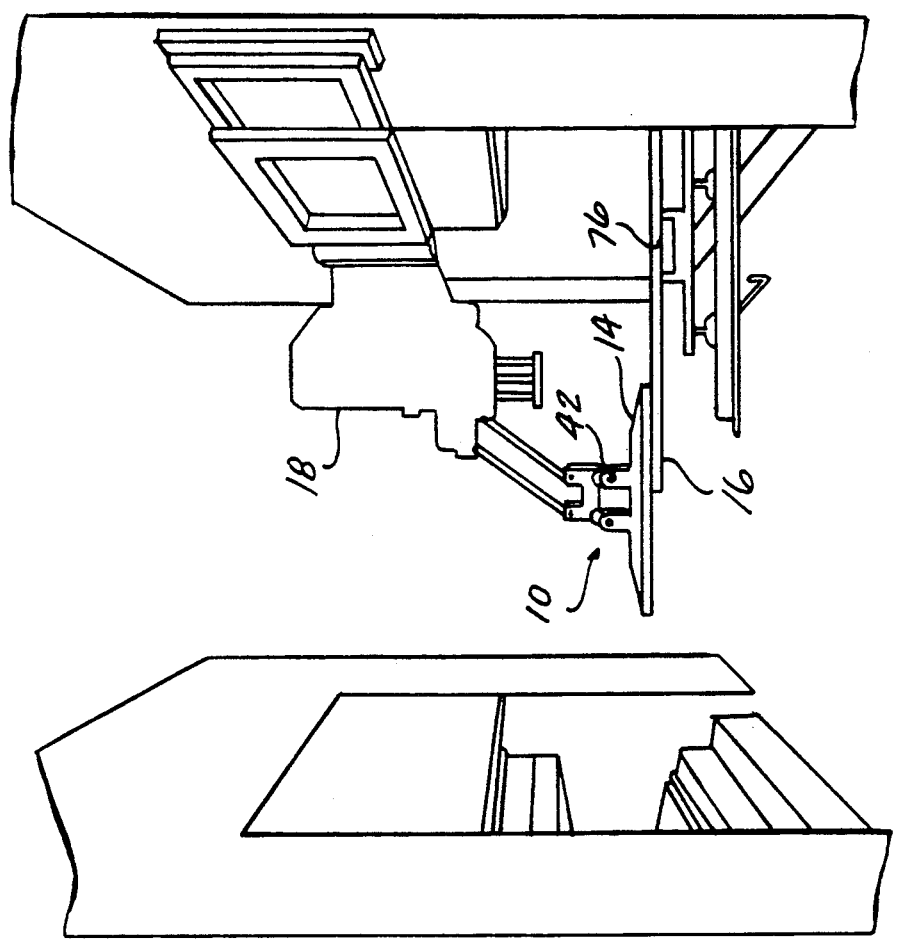
FIG. 4 is a schematic of a workpiece transfer device in use in accordance with the present invention.

Referring to FIGS. 1 and 3, a workpiece transfer device 10 includes a mounting frame assembly 12 having an upper fixed frame 14 and an inner subframe 16. The mounting frame assembly 12 is detachably mounted to a transfer assembly 18 by two equidistant mounting units 20, 22 on top of the upper fixed frame 14.

Each mounting unit 20, 22 comprises a base 24, 26 detachably mounted to the upper fixed frame 14. A plate 28, 30 is detachably mounted atop each base 24, 26.

The transfer assembly 18 includes extended arms 36, 38 having a bearing block 40, 42 mounted at the lower end of each arm 36, 38. Each plate 28, 30 includes a circumferential groove 32, 34 in which the base of the bearing block 40, 42 is slidably mounted. The grooves 32, 34 define the outer circumference of a circle, the center of which is the vertical central axis of the mounting frame assembly 12.

The mounting frame assembly 12 may be rotated about its vertical central axis, if necessary, to properly align the workpiece transfer device 10 between each press (not shown). This adjustment may be done manually by an operator or automatically through the use of an electric device, such as an electric eye, or any other automated means well known in the art.

With reference now to FIG. 3, an inner subframe 16 extends horizontally within fixed frame 14. The subframe 16 is of an H-shaped cross section having opposed side walls 44, 48 and an intermediate member 50 extending between and connecting side walls 44, 48. Both side walls 44, 48 and intermediate member 50 extend the full length of the inner subframe 16. Support walls 52, 54 extend outwardly from each end of side walls 44, 48.

Racks 56, 58 are fixedly attached to the outer surface 60 of the support walls 52. The inner surface 62 of the support wall 52 is slidably mounted to the fixed frame 14.

A conveyor system 64 is supported substantially by the inner subframe 16. The conveyor system 64 includes a conveyor belt 66 rotated about two opposing sprockets or end gears 68, 70. Gears 68, 70 are fixedly attached to opposite ends of the inner subframe 16 while belt 66 rotates about gears 68, 70 and intermediate member 50.

A carrier assembly 72 is mounted at a fixed location to the lower side 74 of the conveyor belt 66. A work holder 76 is removably attached to the carrier assembly 72 and is transported in a horizontal plane. The carrier assembly 72 is slidably transported along the inner subframe 16 by the conveyor belt 66. Locking plate assembly 78 fixedly attaches the upper side 80 of the conveyor belt 66 to the fixed frame 14.

A drive unit 82 is mounted at a fixed location on the top face of the fixed frame 14, equidistant between the mounting units 20, 22 at the vertical axis of the mounting frame assembly 12. Drive 82 includes a reversible electric motor 84 which is drivingly coupled to idler rollers 86, 88 mounted adjacent with the fixed frame 14 above the conveyor belt 66.

Idler roller 88 is drivingly coupled to a conveyor drive gear 90 mounted adjacent to idler roller 88. Conveyor drive gear 90 engages racks 56, 58 to drive the conveyor system 64. A belt take-up assembly 92 is located adjacent the locking plate assembly 78.

In use, the workpiece transfer device 10 is attached to a transfer assembly 18. The transfer assembly 18 is located between two press plants located substantially parallel to each other. The transfer device 10 automates the transfer of a workpiece from one press plant to the other thereby eliminating the need for a multi-unit transfer system.

Drive gear 90 rotating clockwise, for example, engages racks 56, 58 forcing the inner subframe 16 to slidably move through the fixed frame 14 in a horizontal plane. This forces the conveyor system 64 to travel to the right as it is fixedly attached to the inner subframe 16.

The locking plate assembly 78 fixedly attaches the conveyor belt 66 to the fixed frame 14. Therefore, as the conveyor system 64 travels to the right, the belt 66 is simultaneously forced to rotate counter-clockwise about gears 68, 70. The conveyor belt 66 moves the carrier 72 with the work holder 76 to a far right position.

The distance traversed by the inner subframe 16 may be programmed or operator controlled. Other systems well known in the art may be employed to determine this distance.

After the workpiece is removed from a press by the workholder 76, the motor 84 reverses direction to force the drive gear 90 to rotate counter-clockwise.

The gear 90 engages racks 56, 58 and moves the inner subframe 16 slidably through the fixed frame 14 along a horizontal plane towards a far left position. Simultaneously, the fixed conveyor belt 66 engages gear 68, 70 forcing them to rotate counter-clockwise. Rotation of the belt 66 about the gears 68, 70 moves the carrier 72 and workholder 76 with the workpiece to a far left position. This enables the workholder 76 to place the workpiece in a second press eliminating the need for multiple transfer devices.

A further advantage of the transfer device 10 is that, while it is moving in a horizontal plane, it may simultaneously rotate about its vertical axis to adjust for any misalignment which may occur between two presses.

Having described our invention, however, many modifications thereto will become apparent to those skilled in the art to which it pertains without deviation from the spirit of the invention as defined by the scope of the appended claims.

We claim:

1. A workpiece transfer device for attachment to a transfer assembly comprising:
    an outer frame;
    an inner subframe slidably engaged to said outer frame;
    means for carrying a workpiece;
    means for moving said workpiece carrying means along a substantially level conveying plane, said moving means fixedly attached to said inner subframe;

means for driving said inner subframe, said driving means fixedly attached to said outer frame, said workpiece carrying means moving in response to driving the inner subframe; and means for rotating said outer frame about an axis normal to said conveying plane, said rotating means fixedly attached to said transfer assembly, said rotating means including at least one mounting assembly having a circumferential groove defining arc segments of a common circle and having its central axis transverse to said conveying plane, said mounting assembly slidably attachable to said transfer assembly within said groove.

2. The workpiece transfer device of claim 1, further comprising said inner subframe having substantially an H-shape cross-section of opposing elongate sides and an intermediate member extending perpendicular to and between said sides, said inner subframe extending along said conveying plane and supporting said moving means about said intermediate member.

3. The workpiece transfer device of claim 2, further comprising said moving means comprising:

a conveyor system having opposing end gears spaced apart and defining the outer limits of said conveyor system; and a continuous belt extending about said end gears, said belt having teeth means on the inner side thereof meshed with said end gears for rotation about said end gears, said end gears rotatably about an axis perpendicular to said intermediate member of said inner subframe, said belt extending around and rotating about said intermediate member.

4. The workpiece transfer device of claim 3 further comprising at least one gear rack fixedly attached to at least one of said opposing elongate sides of said inner subframe along an axis parallel with said intermediate member, said gear rack having teeth means on the upper side thereof.

5. The workpiece transfer device of claim 4 further comprising locking means having an upper and lower member fixedly attached thereto wherein said upper member is fixedly attached to said outer frame and said lower member is fixedly attached to said belt.

6. The workpiece transfer device of claim 5 further comprising said carrying means fixedly attached to said belt opposite to said gear rack.

7. The workpiece transfer device of claim 6 wherein said means for driving said inner frame further comprises:

a motor;
at least one idler roller; and
a driving gear, said driving gear meshed with said gear rack for reciprocating said gear rack along said conveying plane, said reciprocating of said gear rack driving said inner frame along said conveying plane.

8. A workpiece transfer device for attachment to a transfer assembly comprising:

an outer frame;
an inner subframe slidably engaged to said outer frame;
means for carrying a workpiece;
means for moving said workpiece carrying means along a substantially level conveying plane, said moving means fixedly attached to said inner subframe; and means for rotating said outer frame about an axis normal to said conveying plane, said rotating means fixedly attached to said transfer assembly, said rotating means including at least one mounting assembly having a circumferential groove defining arc segments of a common circle with a central axis normal to said conveying plane, said mounting assembly slidably attachable to said transfer assembly within said groove.

9. The workpiece transfer device of claim 8, further comprising said inner subframe having substantially an H-shape cross-section of opposing elongate sides and an intermediate member extending perpendicular to and between said sides, said inner subframe extending along said conveying plane and supporting said moving means about said intermediate member.

10. The workpiece transfer device of claim 9, wherein said moving means further comprises:

a conveyor system having opposing end gears spaced apart and defining the outer limits of said conveyor system;

a continuous belt extending about said end gears said belt having teeth means on the inner side thereof meshed with said end gears for rotation about said end gears, said end gears rotatably about an axis perpendicular to said intermediate member of said inner subframe, said belt extending around and rotating about said intermediate member.

11. The workpiece transfer device of claim 10 further comprising at least one gear rack fixedly attached to at least one of said opposing elongate sides of said inner subframe along an axis parallel with said intermediate member, said gear rack having teeth means on the upper side thereof.

12. The workpiece transfer device of claim 11 further comprising locking means having an upper and lower member fixedly attached thereto wherein said upper member is fixedly attached to said outer frame and said lower member is fixedly attached to said belt.

13. The workpiece transfer device of claim 12 further comprising said carrying means fixedly attached to said belt opposite to said gear rack.

14. The workpiece transfer device of claim 13 further comprising means for driving said inner subframe, said driving means including:

a motor;
at least one idler roller; and
a driving gear, said driving gear meshed with said gear rack for reciprocating said gear rack along said conveying plane, said reciprocating of said gear rack driving said conveying means along said conveying plane.

15. A workpiece transfer device for attachment to a transfer assembly comprising:

an outer frame;
an inner subframe slidably engaged to said outer frame;
means for carrying a workpiece;
means for moving said workpiece carrying means along a substantially level conveying plane, said moving means fixedly attached to said inner subframe, said inner subframe having substantially an H-shape cross-section of opposing elongate sides and an intermediate member extending perpendicular to and between said sides, said inner subframe extending along said conveying plane and supporting said moving means about said intermediate member and having at least one gear rack fixedly attached to at least one of said opposing elongate sides of said inner subframe along an axis parallel with said intermediate member, said gear rack having teeth means on the upper side thereof, said moving means including a conveyor system having opposing end gears spaced apart and defining the outer limits of said conveyor system, a continuous belt extending about said end gears, said belt having teeth means on the inner side thereof meshed with said end gears for rotation about said end gears, said end gears rotatable about an axis parallel to said conveying plane, said belt extending around and rotating about said intermediate member; and means for rotating said outer frame about an axis normal to said conveying plane and having at least one mounting assembly having a circumferential groove defining arc segments of a common circle with a central axis normal to said conveying plane, said mounting assembly slidably attachable to said transfer assembly within said groove.

16. The workpiece transfer device of claim 15 further comprising locking means having an upper and lower member fixedly attached thereto wherein said upper member is fixedly attached to said outer frame and said lower member is fixedly attached to said belt.

17. The workpiece transfer device of claim 16 further comprising said carrying means fixedly attached to said belt opposite to said gear rack.

18. The workpiece transfer device of claim 17 further comprising means for driving said moving means, said driving means including:
   a motor;
   at least one idler roller; and
   a driving gear, said driving gear meshed with said gear rack for reciprocating said gear rack along said conveying plane, said reciprocating of said gear rack driving said moving means along said conveying plane.

19. In a workpiece transfer apparatus for transferring workpieces from a first work station to a second work station, the workpiece transfer apparatus including an outer frame, an inner subframe slidably engaged with the outer frame, means for carrying a workpiece and means for moving the workpiece carrying means along a substantially level conveying plane, said moving means fixedly attached to the inner subframe, the improvement comprising:

means for rotating the outer frame about an axis normal to the conveying plane, said rotating means fixedly attached to the outer frame, the rotating means including at least one mounting assembly having a circumferential groove defining arc segments of a common circle with a central axis normal to the conveying plane, the mounting assembly slidably attachable to the outer frame within the groove, the inner subframe having substantially an H-shaped cross-section of opposing elongate sides and an intermediate member extending perpendicular to and between the sides, the inner subframe extending along the conveying plane and supporting the moving means about the intermediate member, the moving means including a conveyor system having opposing end gears spaced apart and defining the outer limits of said conveyor system, a continuous belt extending about the end gears, the belt having teeth means on the inner side thereof meshed with the end gears for rotation about the end gears, the end gears rotatable about an axis perpendicular to the intermediate member of the inner subframe, the belt extending around and rotating about the intermediate member, at least one gear rack fixedly attached to at least one of the opposing elongate sides of the inner subframe along an axis parallel with the intermediate member, the gear rack having teeth means on the upper side thereof, locking means having an upper and lower member fixedly attached thereto wherein the upper member is fixedly attached to the outer frame and the lower member is fixedly attached to the belt, the carrying means fixedly attached to the belt opposite to the gear rack, and means for driving the inner subframe, the driving means including a motor, at least one idler roller, and a driving gear, the driving gear meshed with the gear rack for reciprocating the gear rack along the conveying plane, the reciprocating of the gear rack driving the conveying means along the conveying plane, whereby a workpiece is imparted with a reciprocal, essentially linear, first movement segment and a simultaneous second rotational movement segment about an axis perpendicular to said first movement segment for transporting the workpiece from the first work station to the second work station.

* * * * *